United States Patent
Said et al.

(10) Patent No.: US 9,749,453 B2
(45) Date of Patent: Aug. 29, 2017

(54) RELAXATION OF MOBILE DEVICE FEATURES RESTRICTIONS LEVERAGING EMBEDDED AUDITING SYSTEM

(71) Applicant: SAP SE, Walldorf (DE)

(72) Inventors: Bare Said, St. Leon (DE); Frank Brunswig, Heidelberg (DE)

( * ) Notice: Subject to any disclaimer, the term of this patent is extended or adjusted under 35 U.S.C. 154(b) by 0 days.

(21) Appl. No.: 14/947,622

(22) Filed: Nov. 20, 2015

(65) Prior Publication Data

US 2017/0149949 A1    May 25, 2017

(51) Int. Cl.
*H04W 4/00* (2009.01)
*H04M 1/725* (2006.01)

(52) U.S. Cl.
CPC ... *H04M 1/72522* (2013.01); *H04M 1/72572* (2013.01)

(58) Field of Classification Search
CPC  H04M 1/72522; H04M 1/72572; H04W 4/00
USPC ...................................................... 455/414.1
See application file for complete search history.

(56) References Cited

U.S. PATENT DOCUMENTS

| | | | | |
|---|---|---|---|---|
| 6,795,017 B1* | 9/2004 | Puranik | ................. | G01S 5/0027 342/357.77 |
| 7,046,139 B2* | 5/2006 | Kuhn | ..................... | H04N 7/163 340/3.1 |
| 9,037,960 B2* | 5/2015 | Mukhopadhyay | .. | G06F 11/3409 715/212 |
| 2005/0096009 A1* | 5/2005 | Ackley | ................. | H04M 1/663 455/405 |
| 2005/0213511 A1* | 9/2005 | Reece | ................... | H04W 24/00 370/252 |
| 2008/0046886 A1* | 2/2008 | Brown | .................. | G06F 21/577 718/100 |
| 2008/0172746 A1* | 7/2008 | Lotter | ................... | G06F 21/552 726/26 |
| 2009/0029674 A1* | 1/2009 | Brezina | ................. | H04M 15/00 455/405 |
| 2012/0046012 A1* | 2/2012 | Forutanpour | ........... | G06F 21/71 455/411 |
| 2013/0031599 A1* | 1/2013 | Luna | ..................... | G06F 21/554 726/1 |
| 2013/0031601 A1* | 1/2013 | Bott | ....................... | G06F 21/552 726/1 |
| 2013/0143521 A1* | 6/2013 | Hernandez | .............. | H04L 67/22 455/405 |
| 2013/0225151 A1* | 8/2013 | King | ................. | H04M 1/72577 455/419 |

(Continued)

*Primary Examiner* — Nathan Taylor
(74) *Attorney, Agent, or Firm* — Mintz Levin Cohn Ferris Glovsky and Popeo, P.C.

(57) ABSTRACT

Relaxation of mobile device features restrictions leveraging embedded auditing systems is presented. One or more managed applications are designated on the mobile device via a software plug-in to an application management adapter running on the mobile device, each of the one or more managed applications being associated with at least one mobile device feature that generates data related to a local environment of the mobile device. A front-end auditing component captures the data generated by the at least one mobile device feature, which transmits the data to a backend auditing component. The backend auditing component logs the data, and a notification of an event associated with the data is generated for one or more designated recipients.

18 Claims, 2 Drawing Sheets

(56) References Cited

U.S. PATENT DOCUMENTS

| | | | |
|---|---|---|---|
| 2013/0232540 A1* | 9/2013 | Saidi | G06F 21/6218 726/1 |
| 2013/0246114 A1* | 9/2013 | Gala | G06Q 10/06 705/7.15 |
| 2014/0073291 A1* | 3/2014 | Hildner | H04L 41/0806 455/411 |
| 2014/0113593 A1* | 4/2014 | Zhou | H04L 63/20 455/411 |
| 2014/0165212 A1* | 6/2014 | Kasterstein | G06F 21/121 726/28 |
| 2014/0302834 A1* | 10/2014 | Jones | H04W 4/027 455/418 |
| 2014/0335902 A1* | 11/2014 | Guba | H04W 4/027 455/456.4 |
| 2015/0112791 A1* | 4/2015 | Jain | G06Q 30/0269 705/14.41 |
| 2015/0133076 A1* | 5/2015 | Brough | H04W 24/10 455/405 |
| 2015/0256977 A1* | 9/2015 | Huang | H04W 4/028 455/456.3 |
| 2015/0381825 A1* | 12/2015 | Cai | H04M 15/885 455/405 |
| 2016/0242143 A1* | 8/2016 | Lotter | G06F 21/552 |
| 2016/0359948 A1* | 12/2016 | Raabe | H04L 67/025 |

* cited by examiner

RELAXATION OF MOBILE DEVICE FEATURES RESTRICTIONS LEVERAGING EMBEDDED AUDITING SYSTEM

TECHNICAL FIELD

The subject matter described herein relates to managing mobile devices in a sensitive working environment, and more particularly to leveraging embedded auditing systems to enable relaxation of mobile device feature restrictions.

BACKGROUND

The utilization of mobile devices in the working environment has become indispensable. Therefore companies often offer their employees the possibility to use mobile devices issued by the company, or to bring their own devices that can be used and integrated into the company's working environment. In either case, those devices, or the applications running on the devices, need to be fully or partially managed by the companies in order to comply with company policies. In some work environments, such as those handling highly sensitive company data, there is a particular need to control the usage of the mobile device's native features such as camera, microphone, Bluetooth® connection, etc.

A simple approach is to simply deactivate those features on mobile devices used in a company's working environment. However, such approach has been considered to be unacceptably restrictive. Another approach is a geofencing-based deactivation, in which one or more features of the mobile device are automatically deactivated within a defined geographical area, i.e. based on a geoposition of the mobile device. However, such approach is still overly restrictive in most cases because the deactivation is not context sensitive but only geo-position related. Further, such approach requires controlling other device features such as GPS, WLAN, or Bluetooth, etc. There are no other factors involved. Thus, device features will either be activated or deactivated there is no solution in between.

Yet another approach is to monitor and log service invocation by mobile applications. Business application services invoked by a mobile application can be logged so that auditing on a business application invocation level can be executed. But this solution does not log any utilization of device features and especially not with respect to a user's working environment.

Accordingly, there is a need for a flexible solution for managing mobile devices in an enterprise environment that enables the relaxation of restrictions related to device features, but at same time allows compliance to company policies.

SUMMARY

In some aspects, a system and method for monitoring and tracking activities related to use of mobile device features by a user in the working environment are disclosed. Instead of deactivating certain features of the mobile device, those features can still be activated but their utilization is logged. In one aspect, for example, when an employee takes a picture or video in the working environment, the resultant information, including the picture or video, is sent automatically to an auditing component. The auditing component can run as an additional mobile service on the mobile device backend system. The auditing service can be used in an auditing process to provide full information about device features utilization including the gathered data during utilization.

The system and method can include an alerting component, which can be integrated with the auditing component, so that dedicated persons can be immediately notified in case a specific device features was used in the working environment. Auditing relevant device features can be activated through a set of managed applications. A front-end application management layer (e.g. SAP Kapsel) can be extended with an auditing component using plug-in technology. The auditing plug-in can communicate with a backend system, which runs a corresponding backend component to log the data. The backend component also provides a configuration, monitoring and tracking console in order to expose the gathered and logged information.

In one aspect, a method includes designating, via a software plug-in to an application management adapter running on a mobile device, one or more managed applications from a plurality of mobile applications on the mobile device. Each of the one or more managed applications is associated with at least one mobile device feature that generates data related to a local environment of the mobile device. The method further includes capturing, by a front-end auditing component associated with the application management adapter, the data generated by the at least one mobile device feature. The method further includes transmitting, from the front-end auditing component to a backend auditing component via a communications network, the data generated by the at least one mobile device feature, and logging, by the backend auditing component, the data generated by the at least one mobile device feature and associated information about the data. The method further includes generating, by a notifications module associated with the backend auditing component, an electronic notification of an event associated with the data for transmission to one or more designated recipients via the communications network.

In some variations, a method can further include setting, by a configuration rules module of the backend auditing component, configuration rules associated with mobile device feature and/or the data generated by the mobile device feature, the configuration rules including a rule of whether or not to capture the data by the front-end auditing component. The method further includes transmitting, by the backend auditing component to the front-end auditing component, the configuration rules associated with the mobile device feature.

Implementations of the current subject matter can include, but are not limited to, systems and methods consistent with one or more features described herein, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

This document describes a system and method for monitoring and tracking activities related to use of mobile device features by a user in the working environment. Instead of certain features of the mobile device being deactivating, those features can still be activated but their utilization is logged. In one exemplary implementation, when an employee takes a picture or video in the working environment, the resultant information, including the picture or video, is sent automatically to an auditing component of an auditing system. The auditing component can run as an additional mobile service on a mobile device backend system. The auditing component executes an auditing process to provide full information about device features utilization, including the gathered data during utilization.

The system and method can further include an alerting component, which can be integrated with the auditing component on the auditing system, so that one or more persons can be immediately notified by the auditing system in case a specific device feature was used in the working environment. Auditing relevant device features can be activated through a set of managed applications on the mobile devices. A front-end application management layer (e.g. SAP Kapsel) can be extended with an auditing component front-end using plug-in technology. The auditing plug-in can communicate with a backend system, which runs a corresponding backend auditing component to log data collected by the auditing plug-in. The backend component also provides a configuration, monitoring and tracking console in the form of a graphical user interface, for display on a display device in communication with the backend component, in order to expose the gathered and logged information.

Figure 1:
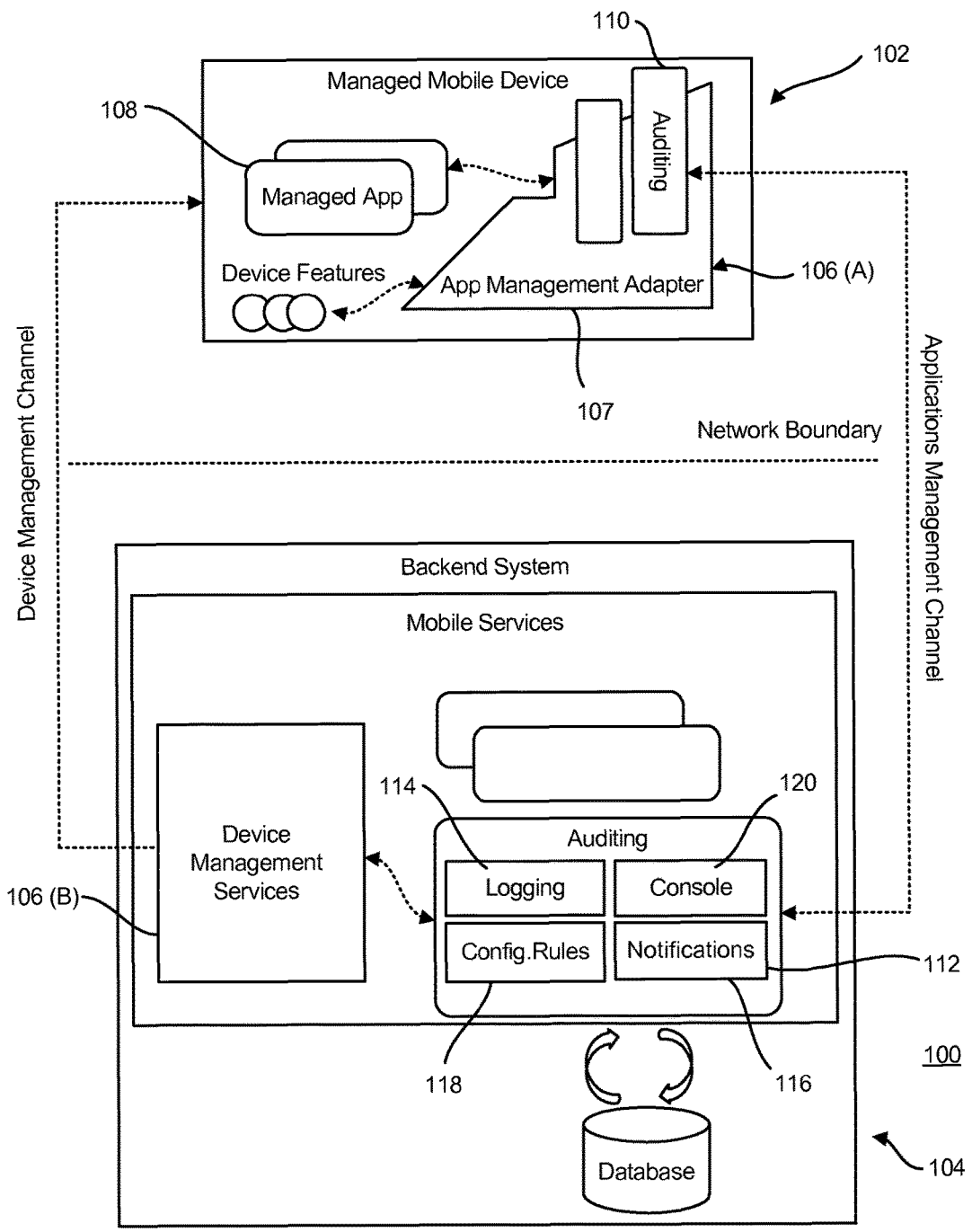
FIG. 1 illustrates an auditing system that enables relaxation of mobile device features restrictions in a working environment.

FIG. 1 illustrates an auditing system 100 that enables relaxation of mobile device features restrictions in a working environment, by leveraging embedded logging and auditing features. The auditing system 100 combines mobile device management, mobile application management, geo fencing, mobile device feature use logging and auditing. The system 100 enables utilizing mobile device features even in a highly sensitive working environment, yet at same time being compliant with company policy regarding the user of mobile devices in such environment. The auditing system includes a front-end component 102 on each managed mobile device, and a backend component 104, such as a server in communication with each managed mobile device.

In some implementations, mobile devices are managed by a mobile device management system 106 (e.g. SAP Afaria) that also has a front-end management component 106A and a backend management component 106B. Mobile device features such as a camera or a microphone are wrapped and controlled within a device application wrapper, also called an application management adapter 107, which is a control bridge between a running application (i.e. "managed application 108") and an associated native device feature. All device feature actions that are triggered by the managed application 108 can be intercepted by a front-end auditing component 110 of the application management adapter 107. Information about the intercepted action can then be sent by front-end auditing component 110 over a communication network to a corresponding backend auditing component 112 running in the backend component 104, including the data created during action processing (e.g. photo or image). In one exemplary system, such a front-end auditing component can be implemented as an Apache Cordova plugin.

The backend auditing component 112 runs as an additional backend mobile service canonically on a mobile platform that offers a set of standard mobile services. The backend auditing component 112 includes a logging module 114, a notifications module 116, a configuration rules module 118, and a console module 120. The logging module 114 logs and stores data sent by the corresponding frontend auditing plugin 110 in the backend component 104. The data includes data created by the mobile device feature (i.e. photo), and can include additional data from the mobile device or generated by the logging module 114, such as header information, user, device, application, time, location.

The notification module 116 is an active module configured to notify one or more parties when a preconfigured action is triggered, such as, for example, when a user takes a picture at a location that is configured as a highly-sensitive location within the workplace. The action details are not only logged but also immediately published to dedicated persons via an electronic notification channel such as SMS or electronic mail.

The configurations rules module 118 provides flexibility for the organization, as different rules in combination with different device features, different locations, and even different users (role-dependent) can be configured. The configuration rules module 118 interacts with device management component 106B to ensure or to enforce the activation or deactivation of the device feature or the corresponding logging depending on configured rules. For example, in order to have comprehensive auditing when a picture is taken in a working environment, the exact geo-position may need to be determined. The determination of the mobile device position may require an active GPS and active WLAN connection to the corporate network. If the mobile device is not WLAN connected, the configuration rules module 118 can generate and send a request to the mobile device of the user to ask the user to connect to the corporate network via WLAN. On the other hand, logging of taking pictures can be avoided if the device is outside working environment as configured by the configuration rules module 118. In this case, the log for taking pictures is not sent to the backend component 104 of the auditing system 100. In this example, the configuration rules module 118 can generate a message for the user asking the user to activate the GPS of their mobile device if that user wants to avoid having taken pictures sent to the auditing system 100.

The console module 120 generates a user-interactive console in a graphical user interface, for display to a user. The console generated by the console module 120 is used to set up and maintain the configuration rules described above, and also to expose and to explore the logged data. The console can provide a rules editor, as well as a set of tailored reports on top of logged data.

Figure 2:
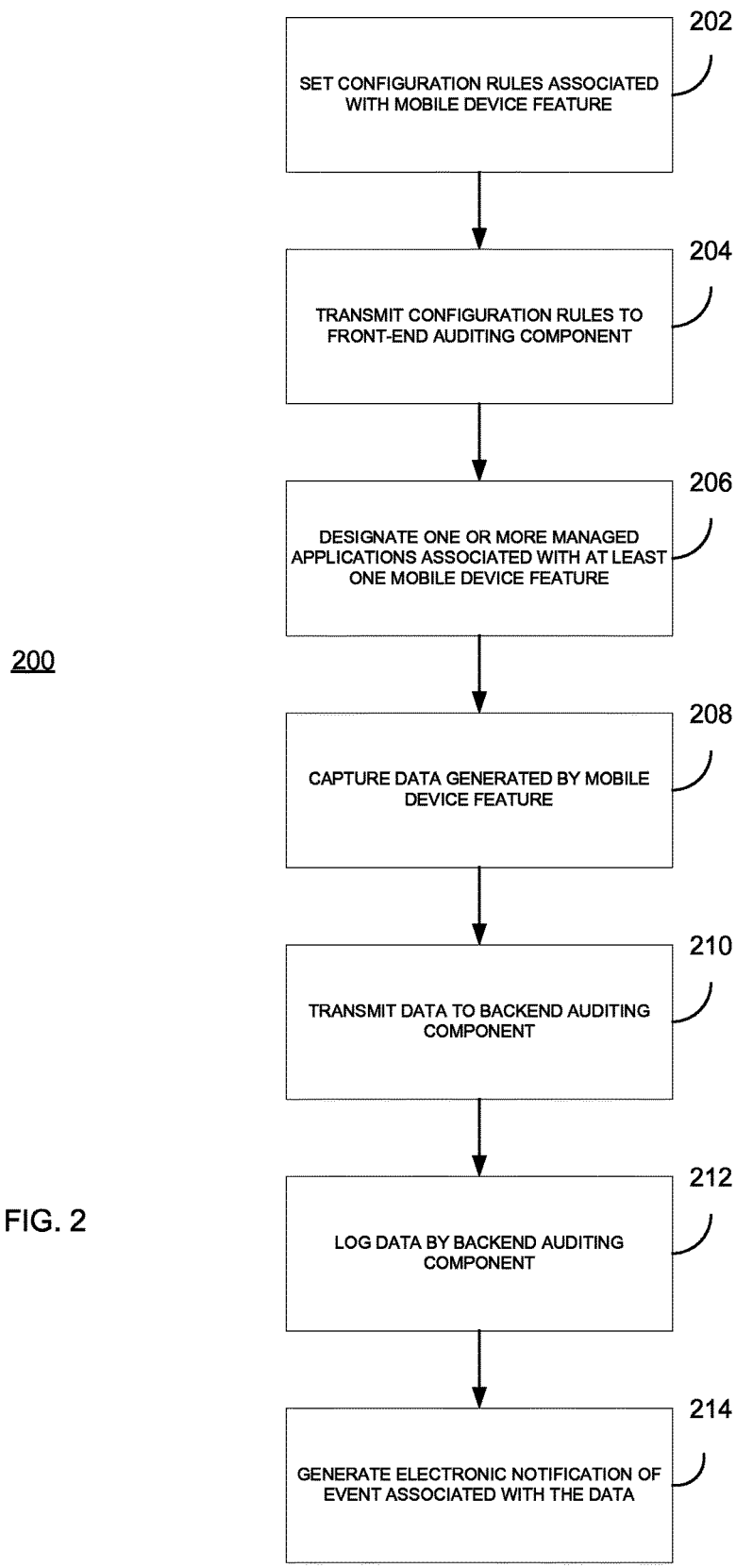
FIG. 2 is a flowchart of a method 200 for enabling relaxation of mobile device features restrictions in a working environment.

FIG. 2 is a flowchart of a method 200 for enabling relaxation of mobile device features restrictions in a working environment. At 202, a configuration rules module of a backend auditing component sets by configuration rules associated with a mobile device feature and/or the data generated by the mobile device feature. The configuration rules include a rule of whether or not to capture the data by the front-end auditing component, and can also include geographic boundaries, time frames and time durations, and security levels, etc., for allowing operation of the mobile device feature. At 204, the backend auditing component transmits the configuration rules associated with the mobile device feature to a front-end auditing component.

At 206, a software plug-in to an application management adapter running on a mobile device designates one or more managed applications from any number of mobile applications on the mobile device. Each of the one or more managed applications is associated with at least one mobile device feature that generates data related to a local environment of the mobile device. In some implementations, the mobile device feature can be a camera, and a managed application can be an image storage and transmitting application. Such application can also include other applications, such as a texting or email application that can transmit an image as an attachment. In yet other applications, the mobile device feature can include a text input feature such as a keyboard, which can be a physical keyboard or a touch-sensitive display of a keyboard.

At 208, the front-end auditing component associated with the application management adapter captures the data generated by the at least one mobile device feature, and at 210 the front-end auditing component transmits the data generated by the at least one mobile device feature to the backend auditing component via a communications network. At 212, the backend auditing component logs the data generated by the at least one mobile device feature and associated information about the data. At 214, a notifications module associated with the backend auditing component generates an electronic notification of an event associated with the data for transmission to one or more designated recipients via the communications network.

The solution offers a sophisticated controlling mechanism for the utilization of device features in the working environment by combing different approaches. Mobile device management, mobile application management, geo fencing, and auditing are combined in one solution that enables utilizing mobile device features even in highly sensitive working environment and at same time being compliant with company policy.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
receiving, via a software plug-in at a mobile device, configuration rules from a backend server, an application management adapter running on the mobile device comprising the software plug-in, the application management adapter configured to at least control interaction between one or more mobile applications on the mobile device and at least one mobile device component configured to interface with a local environment of the mobile device;
determining, via the software plug-in and based on a location of the mobile device, whether data generated by the at least one mobile device component was generated within a context defined by the received configuration rules;
capturing, via the software plug-in and in response to determining that the data was generated within the context, the data generated by the at least one mobile device component; and
transmitting, from the mobile device to the backend server, the captured data.

2. The method in accordance with claim 1, wherein the context defined by the received configuration rules includes an area within a workplace indicated as highly-sensitive.

3. The method in accordance with claim 1, wherein the capturing comprises intercepting the data, after the data is generated, based on the application management adapter monitoring the one or more mobile applications.

4. The method in accordance with claim 1, wherein the at least one mobile device component comprises a camera, and wherein the one or more mobile application comprises a photo application configured to control generation of the data via the camera.

5. The method in accordance with claim 1, wherein the at least one mobile device component comprises a radio antenna, and wherein the one or more mobile applications comprises a texting application configured to control generation of the data via the radio antenna.

6. The method in accordance with claim 1, wherein the at least one mobile device component comprises a microphone, and wherein the one or more mobile applications comprises a sound recording storage and playback application configured to control generation of the data via the microphone.

7. A non-transitory computer program product storing instructions that, when executed by at least one programmable processor, cause the at least one programmable processor to perform operations comprising:
receiving, via a software plug-in at a mobile device, configuration rules from a backend server, an application management adapter running on the mobile device comprising the software plug-in, the application management adapter configured to at least control interaction between one or more mobile applications on the mobile device and at least one mobile device component configured to interface with a local environment of the mobile device;
determining, via the software plug-in and based on a location of the mobile device, whether data generated by the at least one mobile device component was generated within a context defined by the received configuration rules;
capturing, via the software plug-in and in response to determining that the data was generated within the context, the data generated by the at least one mobile device component; and
transmitting, from the mobile device to the backend server, the captured data.

8. The computer program product in accordance with claim 7, wherein the context defined by the received configuration rules includes an area within a workplace indicated as highly-sensitive.

9. The computer program product in accordance with claim 7, wherein the capturing comprises intercepting the data, after the data is generated, based on the application management adapter monitoring the one or more mobile applications.

10. The computer program product in accordance with claim 7, wherein the at least one mobile device component comprises a camera, and wherein the one or more mobile application comprises a photo application configured to control generation of the data via the camera.

11. The computer program product in accordance with claim 7, wherein the at least one mobile device component comprises a radio antenna, and wherein the one or more mobile applications comprises a texting application configured to control generation of the data via the radio antenna.

12. The computer program product in accordance with claim 7, wherein the at least one mobile device component comprises a microphone, and wherein the one or more mobile applications comprises a sound recording storage and playback application configured to control generation of the data via the microphone.

13. A system comprising:
at least one programmable processor; and
a machine-readable medium storing instructions that, when executed by the at least one processor, cause the at least one programmable processor to perform operations comprising:
receiving, via a software plug-in at a mobile device, configuration rules from a backend server, an application management adapter running on the mobile device comprising the software plug-in, the application management adapter configured to at least control interaction between one or more mobile applications on the mobile device and at least one mobile device component configured to interface with a local environment of the mobile device;
determining, via the software plug-in and based on a location of the mobile device, whether data generated by the at least one mobile device component was generated within a context defined by the received configuration rules;

capturing, via the software plug-in and in response to determining that the data was generated within the context, the data generated by the at least one mobile device component; and transmitting, from the mobile device to the backend server, the captured data.

14. The system in accordance with claim 13, wherein the context defined by the received configuration rules includes an area within a workplace indicated as highly-sensitive.

15. The system in accordance with claim 14, wherein the capturing comprises intercepting the data, after the data is generated, based on the application management adapter monitoring the one or more mobile applications.

16. The system in accordance with claim 13, wherein the at least one mobile device component comprises a camera, and wherein the one or more mobile application comprises a photo application configured to control generation of the data via the camera.

17. The system in accordance with claim 13, wherein the at least one mobile device component comprises a radio antenna, and wherein the one or more mobile applications comprises a texting application configured to control generation of the data via the radio antenna.

18. The system in accordance with claim 13, wherein the at least one mobile device component comprises a microphone, and wherein the one or more mobile applications comprises a sound recording storage and playback application configured to control generation of the data via the microphone.

* * * * *